(12) United States Patent
Iwano

(10) Patent No.: US 9,145,174 B2
(45) Date of Patent: Sep. 29, 2015

(54) FENDER SUPPORTING PORTION STRUCTURE

(71) Applicant: TOYOTA JIDOSHA KABUSHIKI KAISHA, Toyota-shi, Aichi (JP)

(72) Inventor: Yoshihiro Iwano, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/411,591

(22) PCT Filed: Sep. 12, 2013

(86) PCT No.: PCT/JP2013/074760
§ 371 (c)(1),
(2) Date: Dec. 29, 2014

(87) PCT Pub. No.: WO2014/069113
PCT Pub. Date: May 8, 2014

(65) Prior Publication Data
US 2015/0158531 A1    Jun. 11, 2015

(30) Foreign Application Priority Data

Nov. 5, 2012    (JP) ................................. 2012-243314

(51) Int. Cl.
*B62D 25/00*    (2006.01)
*B62D 25/16*    (2006.01)

(52) U.S. Cl.
CPC .................................. *B62D 25/163* (2013.01)

(58) Field of Classification Search
CPC ..... B62D 25/163; B62D 21/152; B62D 21/157
USPC ........ 296/187.03, 187.09, 187.1, 187.12, 198
See application file for complete search history.

(56) References Cited

U.S. PATENT DOCUMENTS

| 6,554,341 B2 * | 4/2003 | Lee ................................. 296/29 |
| 7,497,503 B2 * | 3/2009 | Ito ............................ 296/187.04 |
| 8,182,027 B2 * | 5/2012 | Steinhilb et al. .............. 296/198 |
| 2006/0064845 A1 | 3/2006 | Fujii et al. |

FOREIGN PATENT DOCUMENTS

| JP | 2005-329874 A | 12/2005 |
| JP | 2006-096255 A | 4/2006 |
| JP | 2011-136597 A | 7/2011 |

* cited by examiner

*Primary Examiner* — Joseph D Pape
(74) *Attorney, Agent, or Firm* — Kenyon & Kenyon LLP

(57) ABSTRACT

At a bracket, a length in a vehicle vertical direction of a second supporting leg portion is set to be longer than a length in the vehicle vertical direction of a first supporting leg portion. A height position in the vehicle vertical direction of the second supporting portion is set to be lower than that of a first supporting portion. At the bracket, a first bent portion is formed at an upper portion of the first supporting leg portion, and a second bent portion is formed at an upper portion of the second supporting leg portion. The first bent portion and the second supporting leg portion are bent so as to be convex toward sides of moving apart from one another. A region of the first supporting leg portion and a region of the second supporting leg portion are connected by a connecting member.

3 Claims, 7 Drawing Sheets

FENDER SUPPORTING PORTION STRUCTURE

CROSS-REFERENCE TO RELATED APPLICATIONS

This is a US national phase application based on the PCT International Patent Application No. PCT/JP2013/074760 filed on Sep. 12, 2013, and claiming the priority of Japanese Patent Application No. 2012-243314 filed on Nov. 5, 2012, the entire contents of which are herewith incorporated by reference.

TECHNICAL FIELD

The present invention relates to a fender supporting portion structure.

RELATED ART

There are cases in which, at a fender panel, the end portion at the inner side of the fender panel is mounted to an apron upper member via fender brackets for absorbing energy, in order to absorb the impact that is applied at the time of a collision with a collision body from a vehicle upper side (see, for example, Patent Document 1).

PRIOR ART DOCUMENTS

Patent Documents

Patent Document 1: Japanese Patent Application Laid-Open (JP-A) No. 2011-136597

SUMMARY OF INVENTION

Technical Problem

However, when considering dispersion in collision positions of collision bodies and the like, there is room for improvement from the standpoint of devising stable impact absorption.

In consideration of the above-described circumstances, an object of the present invention is to provide a fender supporting portion structure that can devise stable impact absorption.

Solution to Problem

A fender supporting portion structure relating to a first aspect of the present invention comprises: vehicle body skeleton portions that are disposed along a vehicle longitudinal direction at both sides of a vehicle body front portion, and that have first supporting portions whose supporting surfaces face toward a vehicle upper side, and second supporting portions that are provided at intervals with respect to the first supporting portions and whose supporting surfaces face toward the vehicle upper side and whose height positions in a vehicle vertical direction are set to be lower than those of the first supporting portions; and brackets for energy absorption that cause the vehicle body skeleton portions to support inner side end portions of upper portions of fender panels and whose cross-sectional shapes are formed in hat-shapes, and that have fender mounting portions to which the inner side end portions of the upper portions of the fender panels are fixed, first vehicle body side mounting portions that are fixed to the first supporting portions, second vehicle body side mounting portions that are fixed to the second supporting portions, first supporting leg portions that join the fender mounting portions and the first vehicle body side mounting portions in the vehicle vertical direction, and second supporting leg portions that join the fender mounting portions and the second vehicle body side mounting portions in the vehicle vertical direction and whose lengths in the vehicle vertical direction are set to be longer than those of the first supporting leg portions.

In accordance with the fender supporting portion structure relating to the first aspect of the present invention, the vehicle body skeleton portions are disposed along the vehicle longitudinal direction at both sides of the vehicle body front portion. This vehicle body skeleton portion has a first supporting portion and a second supporting portion whose supporting surfaces face toward the vehicle upper side. The inner side end portion of the upper portion of a fender panel is supported at the vehicle body skeleton portion via the bracket that is hat-shaped in cross-section. Namely, the inner side end portion of the upper portion of the fender panel is fixed to the fender mounting portion of the bracket. At the bracket, the first vehicle body side mounting portion is fixed to the first supporting portion of the vehicle body skeleton portion, and the second vehicle body side mounting portion is fixed to the second supporting portion of the vehicle body skeleton portion.

Here, at the bracket, the length in the vehicle vertical direction of the second supporting leg portion, that joins the second vehicle body side mounting portion and the fender mounting portion, is set to be longer than the length in the vehicle vertical direction of the first supporting leg portion that joins the first vehicle body side mounting portion and the fender mounting portion. Therefore, in a case in which a collision body collides with the upper portion of the fender panel from the vehicle upper side and the bracket receives load, the moment that acts on the second supporting leg portion is large as compared with the moment that acts on the first supporting leg portion. Accordingly, it is easy for the second supporting leg portion to bendingly deform, as compared with the first supporting leg portion. Further, the second supporting portion, at which the second supporting leg portion is supported via the second vehicle body side mounting portion, is provided at an interval with respect to the first supporting portion at which the first supporting leg portion is supported via the first vehicle body side mounting portion, and the height position in the vehicle vertical direction of the second supporting portion is set to be lower than that of the first supporting portion. Due thereto, the bracket deforms on the whole toward the side of the second supporting portion in accordance with the bending deformation of the second supporting leg portion. Accordingly, in accordance with the present invention, the bracket can be deformed in a stable mode.

In a second aspect of the present invention, in the fender supporting portion structure relating to the first aspect, a second rotation angle, that is from a start of rotation until the second supporting leg portion abuts another member in a case of rotating the bracket, that is in a state of being set at a vehicle, toward a side opposite a side of the first supporting leg portion with a lower end portion of the second supporting leg portion being a rotational center and the second supporting leg portion being a radius of rotation, is set to be larger than a first rotation angle, that is from a start of rotation until the first supporting leg portion abuts another member in a case of rotating the bracket, that is in the state of being set at the vehicle, toward a side opposite a side of the second supporting leg portion with a lower end portion of the first supporting leg portion being a rotational center and the first supporting leg portion being a radius of rotation.

In accordance with the fender supporting portion structure relating to the second aspect of the present invention, the bracket being deformed toward the side of the second supporting portion can make the stroke, until the bracket or the fender panel abuts another member, be longer than a case in which the bracket is deformed toward the side of the first supporting portion. Accordingly, as described above, even if the bracket on the whole is deformed toward the side of the second supporting portion, it is possible to delay so-called bottom-touching or to eliminate so-called bottom-touching.

In a third aspect of the present invention, in the fender supporting portion structure relating to the first aspect or the second aspect, a first bent portion, that is bent so as to be convex toward a side opposite a side of the second supporting leg portion and that has a first ridgeline that extends in a horizontal direction, is formed at an upper portion of the first supporting leg portion, a second bent portion, that is bent so as to be convex toward a side opposite a side of the first supporting leg portion and that has a second ridgeline that extends in the horizontal direction, is formed at an upper portion of the second supporting leg portion, and a region at a vehicle vertical direction intermediate portion of the first supporting leg portion, which region is further toward a lower side than the first bent portion, and a region at a vehicle vertical direction intermediate portion of the second supporting leg portion, which region is further toward a lower side than the second bent portion, are connected by a connecting portion.

In accordance with the fender supporting portion structure relating to the third aspect of the present invention, the first bent portion, that is bent so as to be convex toward the side opposite the side of the second supporting leg portion and that has the first ridgeline that extends in the horizontal direction, is formed at the upper portion of the first supporting leg portion. In contrast, the second bent portion, that is bent so as to be convex toward the side opposite the side of the first supporting leg portion and that has the second ridgeline that extends in the horizontal direction, is formed at the upper portion of the second supporting leg portion. Therefore, in a case in which the bracket receives load from the vehicle upper side, the upper portion of the bracket starts to deform so as to move the first ridgeline and the second ridgeline apart.

On the other hand, the region at the vehicle vertical direction intermediate portion of the first supporting leg portion, which region is further toward the lower side than the first bent portion, and the region at the vehicle vertical direction intermediate portion of the second supporting leg portion, which region is further toward the lower side than the second bent portion, are connected by the connecting portion. Therefore, it is relatively difficult for the first supporting leg portion and the second supporting leg portion to deform at the lower portions thereof where the bent portions are not formed, and it is relatively easy for the first supporting leg portion and the second supporting leg portion to deform at the upper portions thereof where the first bent portion and the second bent portion are formed. Further, in a case in which the bracket receives load from the vehicle upper side, when the upper portion of the bracket starts to deform so as to move the first ridgeline and the second ridgeline apart, accompanying this, tension along the connecting direction is applied to the connecting portion.

At this time, the bracket on the whole deforms toward the side of the second supporting portion in accordance with the bending deformation of the second supporting leg portion as described above. Therefore, the connecting portion is pulled toward the side of the second supporting leg portion with respect to the initial position thereof. In accordance therewith, the first supporting leg portion is pulled by the connecting portion toward the side of the second supporting leg portion, and the first supporting leg portion on the whole is displaced so as to collapse toward the side of the second supporting leg portion. Further, due to the first supporting leg portion collapsing on the whole, the reaction force due to the first supporting leg portion that is applied to the connecting portion is small, and therefore, it is easy for the second supporting leg portion to collapse toward the side opposite the side of the first supporting leg portion. Due to the bracket deforming stably due to the above, the collision energy is absorbed stably.

In a fourth aspect of the present invention, in the fender supporting portion structure relating to the third aspect, at the upper portion of the first supporting leg portion, a first hole is formed so as to pass-through, and the first ridgeline is formed at both sides that sandwich the first hole, at the upper portion of the second supporting leg portion, a second hole is formed so as to pass-through, and the second ridgeline is formed at both sides that sandwich the second hole, and at the connecting portion, an end portion at a connecting direction one side is joined to a hole edge portion at a lower side of the first hole, and an end portion at a connecting direction other side is joined to a hole edge portion at a lower side of the second hole.

In accordance with the fender supporting portion structure relating to the fourth aspect of the present invention, at the upper portion of the first supporting leg portion, the first hole is formed so as to pass-through, and the first ridgeline is formed at the both sides that sandwich the first hole. Accordingly, while the upper portion of the first supporting leg portion is weakened by the first hole, bending deformation of the first supporting leg portion with the first ridgeline being the starting point also is possible. Further, at the upper portion of the second supporting leg portion, the second hole is formed so as to pass-through, and the second ridgeline is formed at the both sides that sandwich the second hole. Accordingly, while the upper portion of the second supporting leg portion is weakened by the second hole, bending deformation of the second supporting leg portion with the second ridgeline being the starting point also is possible.

On the other hand, at the connecting portion, the end portion at the connecting direction one side is joined to the hole edge portion at the lower side of the first hole, and the end portion at the connecting direction other side is joined to the hole edge portion at the lower side of the second hole. Due thereto, at the first supporting leg portion and the second supporting leg portion, the rigidity changes greatly between the region at which the connecting portion is joined and the upper side thereof, and therefore, the bracket can be bendingly deformed stably with these rigidity change portions being the starting points of the bending. Namely, in a case in which the bracket on the whole starts to deform so as to move the first ridgeline and the second ridgeline apart while the bracket deforms toward the side of the second supporting portion, the second supporting leg portion that receives reaction force from the connecting portion bendingly deforms with the aforementioned rigidity change portion being the starting point of the bending.

In a fifth aspect of the present invention, in the fender supporting portion structure relating to the third aspect or the fourth aspect, a relationship between angle $\theta 1$, that is formed by bent surfaces of the first bent portion at a side facing the second supporting leg portion, and angle $\theta 2$, that is formed by bent surfaces of the second bent portion at a side facing the first supporting leg portion, is set to be $\theta 1 < \theta 2$.

In accordance with the fender supporting portion structure relating to the fifth aspect of the present invention, the angle $\theta 1$ of the first bent portion is set to be smaller than the angle $\theta 2$ of the second bent portion. Therefore, in the initial stage in a case in which the bracket receives load from the vehicle upper side, the upper portion of the first supporting leg portion bendingly deforms stably toward the side of the second supporting leg portion with the first ridgeline of the first bent portion being the starting point. Due thereto, because the first supporting leg portion starts to collapse toward the side of the second supporting leg portion from the initial stage, the bracket on the whole deforms more stably toward the side of the second supporting portion.

Advantageous Effects of Invention

As described above, the fender supporting portion structure relating to the first aspect of the present invention has the excellent effect of being able to devise stable impact absorption.

The fender supporting portion structure relating to the second aspect of the present invention has the excellent effects of efficiently utilizing limited space and being able to improve the energy absorbing performance.

The fender supporting portion structure relating to the third aspect of the present invention has the excellent effect of being able to more stably absorb impact by stably deforming plural regions of the bracket, in a case in which the bracket receives load from the vehicle upper side.

The fender supporting portion structure relating to the fourth aspect of the present invention has the excellent effect of being able to more stably absorb impact by bendingly deforming the bracket in a more stable deformation mode, in a case in which the bracket receives load from the vehicle upper side.

The fender supporting portion structure relating to the fifth aspect of the present invention has the excellent effect of being able to even more stably absorb impact by bendingly deforming the first supporting leg portion stably, in a case in which the bracket receives load from the vehicle upper side.

DESCRIPTION OF EMBODIMENTS

Structure of Embodiment

Figure 1:
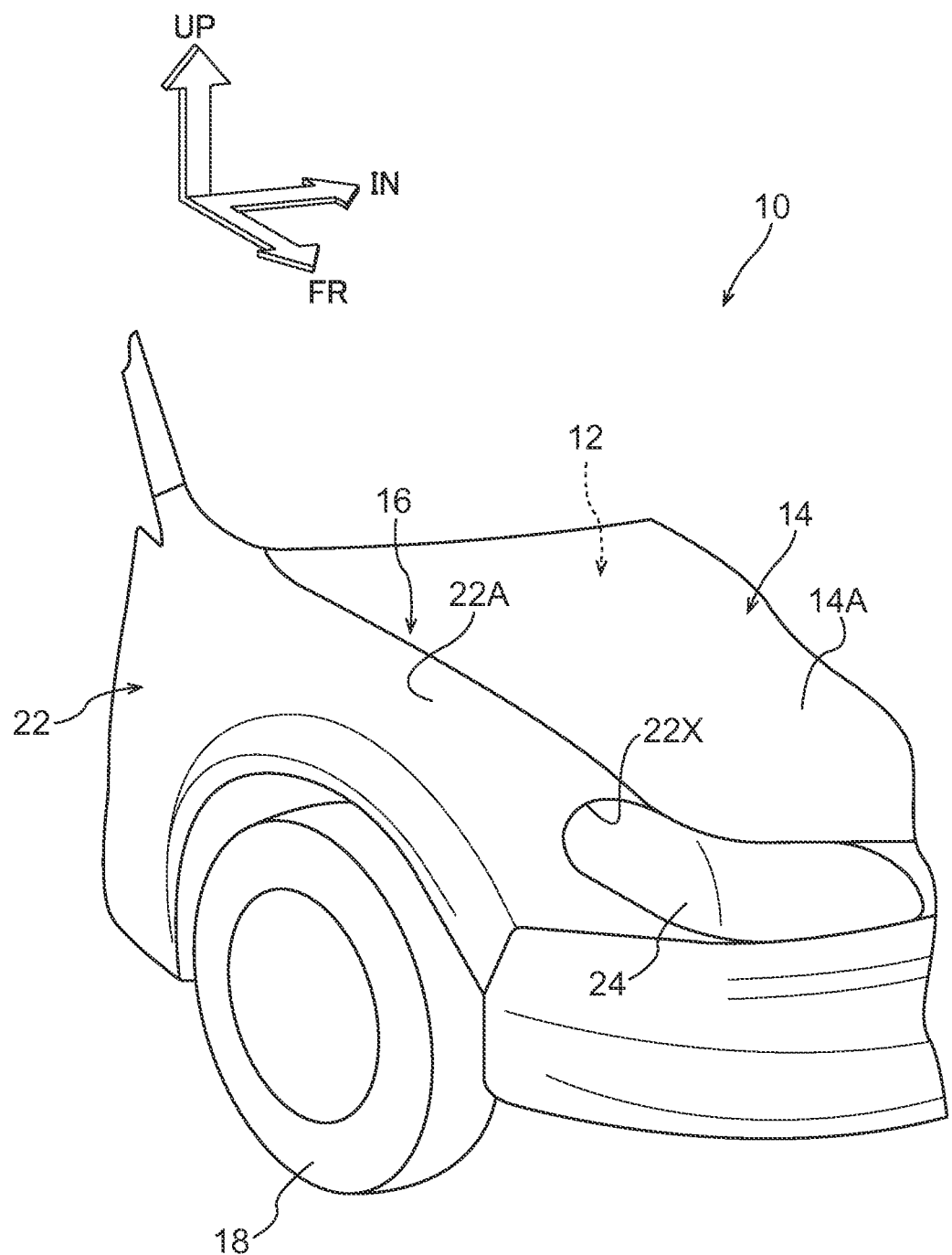
FIG. 1 is a perspective view showing a portion of a vehicle body front portion to which a fender supporting portion structure relating to an embodiment of the present invention is applied.

An embodiment of a fender supporting portion structure of a vehicle in the present invention is described on the basis of the drawings. Note that arrow UP in the drawings indicates the upward direction of the vehicle, arrow FR indicates the frontward direction of the vehicle, and arrow IN indicates the vehicle transverse direction inner side, respectively.

A portion of a vehicle body front portion 10, to which a fender supporting portion structure 20 (see FIG. 2) is applied, is shown in a perspective view in FIG. 1. As shown in FIG. 1, a hood 14, that is made of metal and that can open and close an engine room 12, is disposed at the vehicle upper side of the engine room 12 at the vehicle body front portion 10. The hood 14 is structured to include a hood outer panel 14A that structures the outer plate of the hood 14, and a hood inner panel (not illustrated) that is disposed so as to be apart from the hood outer panel 14A at the hood upper side thereof and that structures the inner plate of the hood 14. The outer peripheral portion of the hood outer panel 14A is joined by hemming processing to the outer peripheral portion of the hood inner panel (not illustrated).

Fender panels (also called "front fender panels") 22 are disposed at the sides of the hood outer panel 14A, i.e., at the side surfaces of the vehicle body front portion 10. Parting portions 16, that are the boundaries between the hood outer panel 14A and the fender panels 22, extend substantially in the vehicle longitudinal direction at the vehicle transverse direction both end portions of the hood 14. The fender panel 22 has an outer side vertical wall portion 22A that covers the upper side of a front wheel 18 and structures a design surface. A cut-out portion 22X, that is cut-out from the vehicle front side as if to be hollowed-out in a concave shape, is formed in the front end upper portion of the outer side vertical wall portion 22A. A head lamp 24 is disposed adjacent to this cut-out portion 22X.

Figure 2:
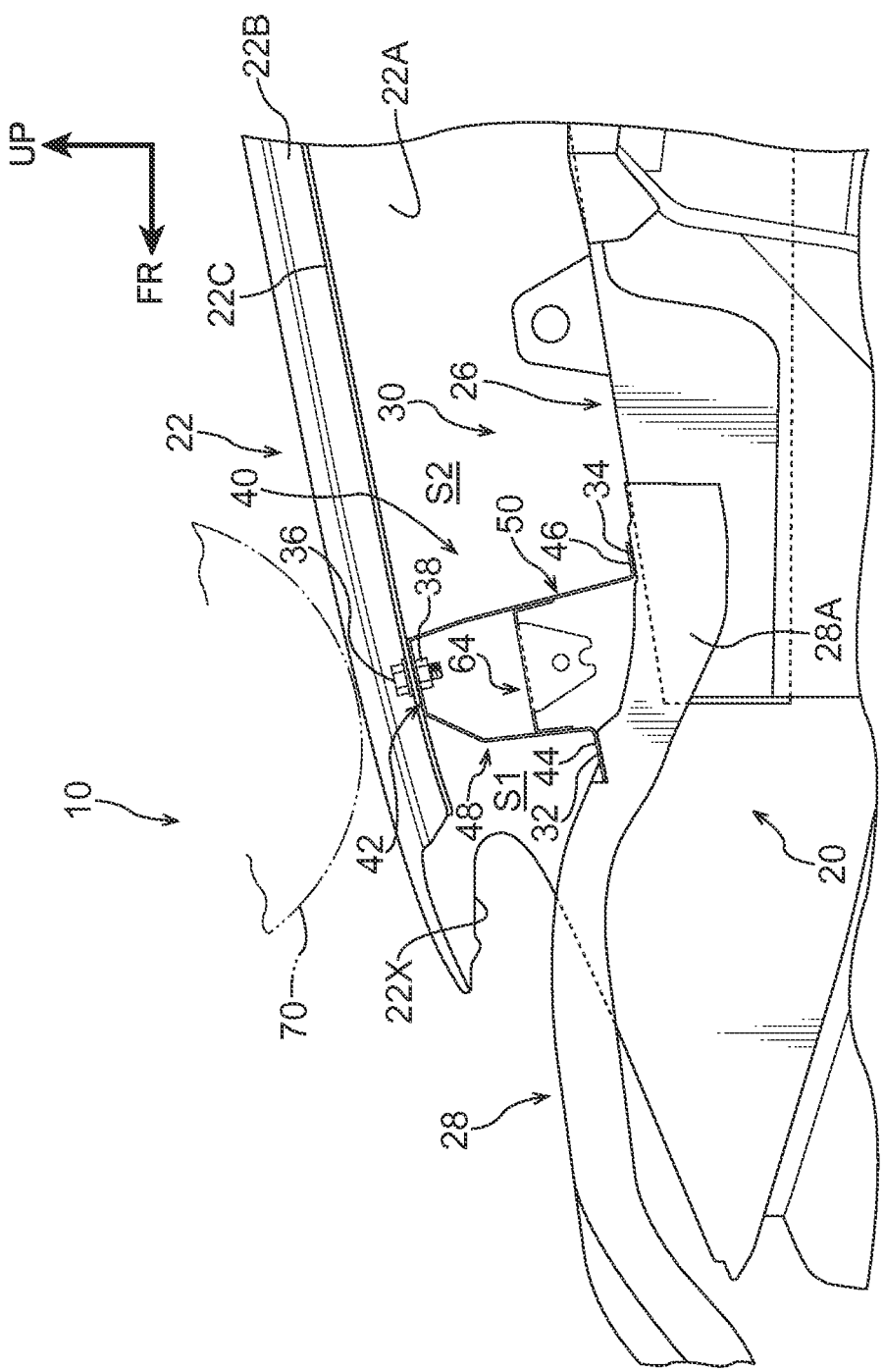
FIG. 2 is a side view showing the fender supporting portion structure relating to the embodiment of the present invention, in a state of being viewed from a vehicle transverse direction inner side.

The fender supporting portion structure 20 is shown in FIG. 2 in a side view in a state of being seen from the vehicle transverse direction inner side. Note that illustration of the head lamp 24 (see FIG. 1), that is adjacent to the fender supporting portion structure 20, and parts associated therewith and the like is omitted from FIG. 2. As shown in FIG. 2, the upper portion of the fender panel 22 has an inner side vertical wall portion 22B that hangs-down from the upper end portion of the outer side vertical wall portion 22A, and a horizontal flange portion 22C that serves as an inner side end portion and that extends substantially horizontally from the lower end portion of this inner side vertical wall portion 22B toward the engine room 12 side. Only the plate thickness portion of the horizontal flange portion 22C can be seen in FIG. 2. An unillustrated sealing material, that is structured by an elastic material (rubber), is disposed at the vehicle transverse direction inner side of the inner side vertical wall portion 22B. In elastically deformed states, these sealing materials press-contact the transverse direction both end portions at the outer peripheral portion of the hood 14 (see FIG. 1).

An apron upper member 26 and a rear end portion 28A of a radiator support upper side 28 are disposed at the vehicle lower side of the horizontal flange portion 22C of the fender panel 22. The apron upper members 26 structure portions of vehicle body skeleton portions 30, and are disposed along the vehicle longitudinal direction at the both sides of the vehicle body front portion 10, and structure closed cross-sectional portions (not shown) that extend in the vehicle longitudinal direction. The rear end portion 28A of the radiator support upper side 28 is joined to the front end portion of the apron member 26.

The radiator support upper side 28 structures a portion of the vehicle body skeleton portion 30, and is formed in a closed cross-sectional shape whose vehicle lower side is open, and the rear end portion 28A thereof is superposed on the front end portion of the apron upper member 26. The rear end portion 28A (the region that is disposed at the vehicle lower side of the horizontal flange portion 22C) of the radiator support upper side 28 is disposed along the vehicle longitudinal direction, and the region at the front side of this rear end portion 28A extends at an incline toward the vehicle transverse direction inner side while heading toward the vehicle front side. Further, the vehicle longitudinal direction intermediate portion of the radiator support upper side 28 protrudes-out slightly toward the vehicle upper side. The front end portions of the radiator support upper sides 28 are joined to the both end portions in the vehicle transverse direction of a radiator support upper (not shown). Note that this radiator support upper is disposed at the upper portion of the vehicle body front end side with the vehicle transverse direction being the length direction thereof, and supports the upper portion of a radiator (not shown).

The horizontal flange portion 22C of the fender panel 22 is supported at the vehicle body skeleton portion 30 via brackets 40 for energy absorption. Note that plural brackets for supporting the horizontal flange portion 22C of the fender panel 22 are disposed at a predetermined interval in the vehicle longitudinal direction, but, in FIG. 2, only one thereof (the bracket 40) is illustrated.

Figure 3:
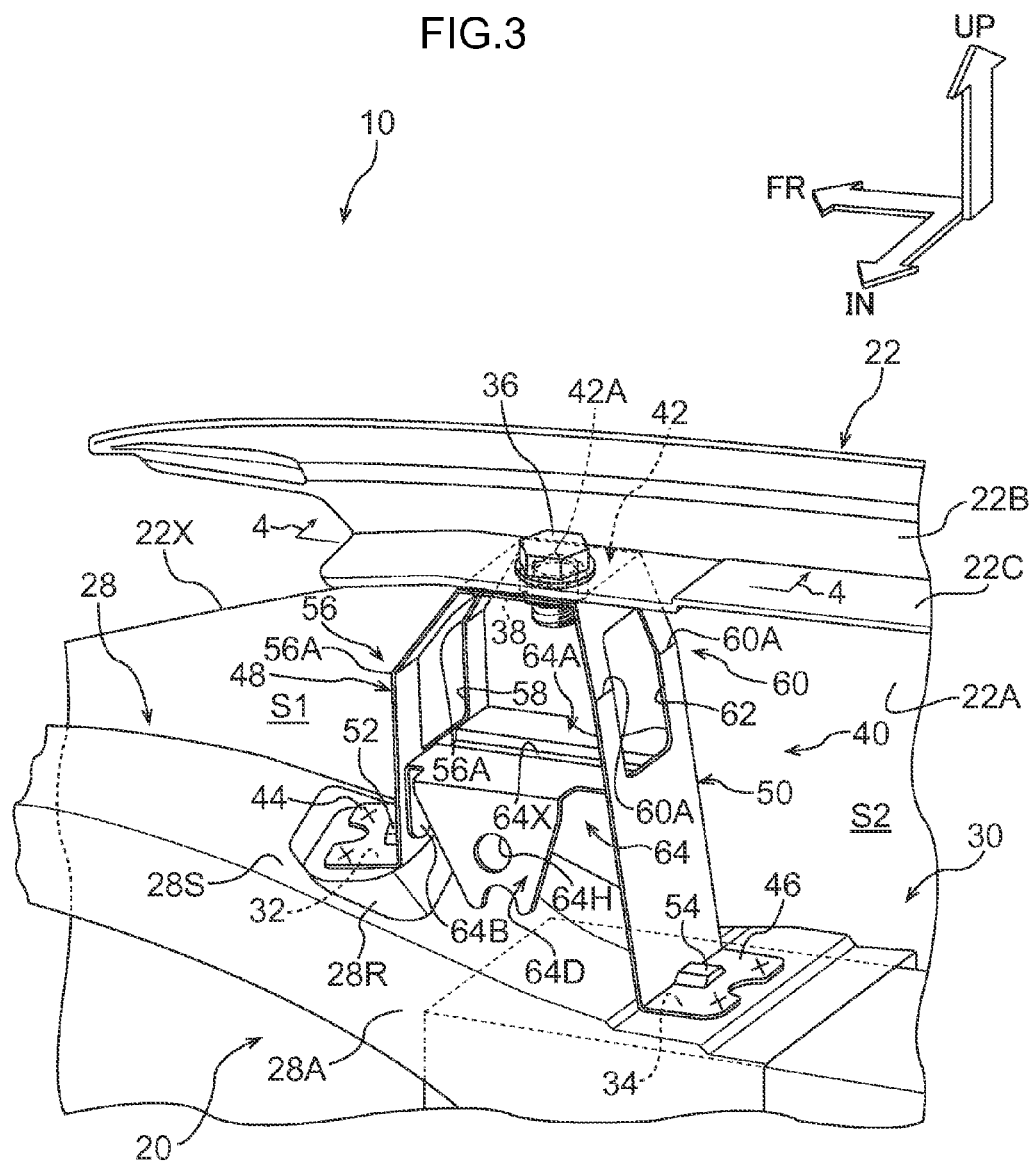
FIG. 3 is a perspective view showing, in an enlarged manner, a bracket of FIG. 2 and the peripheral portion thereof.
Figure 4:
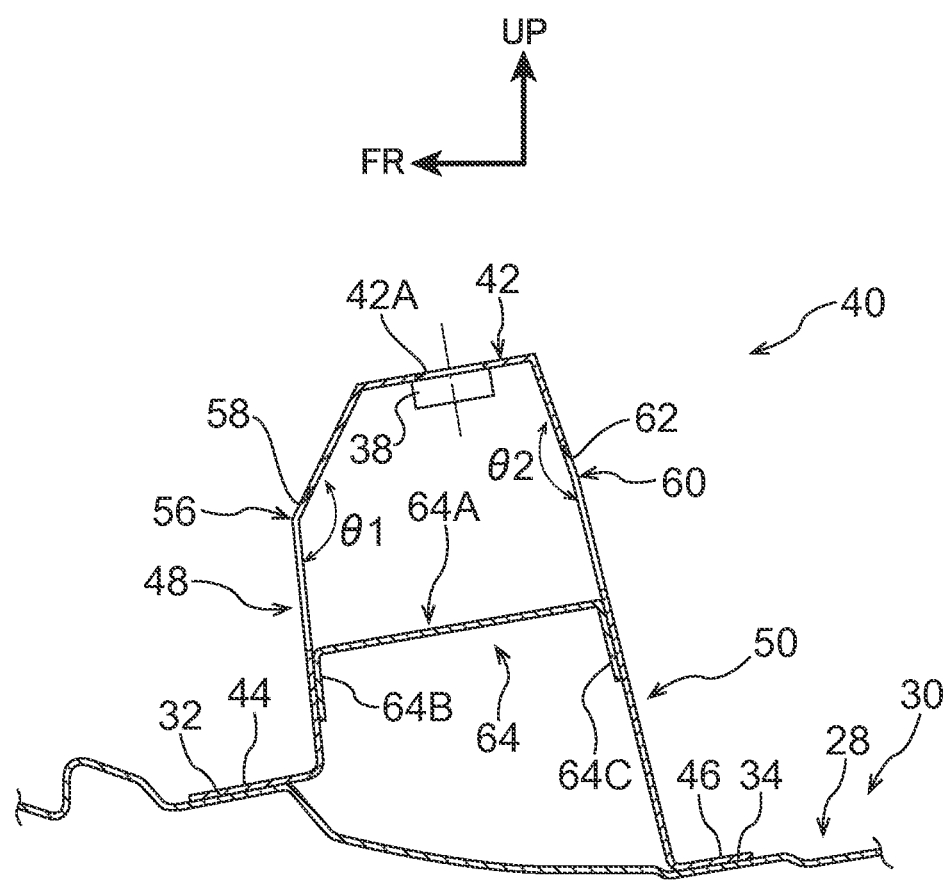
FIG. 4 is a cross-sectional view in which the bracket of FIG. 3 and a rear end portion of a radiator support upper side are cut along line 4-4 of FIG. 3.

The bracket 40 and the peripheral portion thereof are shown in FIG. 3 in a perspective view of an enlarged state. Further, a cross-sectional view, in which the bracket 40 of FIG. 3 and the rear end portion 28A of the radiator support upper side 28 are cut along line 4-4 of FIG. 3, is shown in FIG. 4. Note that illustration of the head lamp 24 (see FIG. 1), that is adjacent to the fender supporting portion structure 20, and parts associated therewith and the like is omitted from FIG. 3. As shown in FIG. 3, a first supporting portion 32 and a second supporting portion 34 that serve to support the bracket 40 are provided at the rear end portion 28A of the radiator support upper side 28.

The first supporting portion 32 is provided slightly further toward the front side than the superposed portion of the rear end portion 28A of the radiator support upper side 28 with the apron upper member 26. The peripheral portion of the first supporting portion 32 is made to be an inclined wall portion 28S that is inclined slightly toward the vehicle upper side while heading toward the vehicle front. The peak portion of a protruding portion 28R, that is formed by a portion of this inclined wall portion 28S being protruded toward the vehicle upper side, is made to be the first supporting portion 32. The protruding portion 28R is provided such that the amount of protrusion thereof from the inclined wall portion 28S decreases toward the vehicle front side. The supporting surface of the first supporting portion 32 faces toward the vehicle upper side (strictly speaking, toward the vehicle upper side and inclined slightly forward) (see FIG. 4).

On the other hand, the second supporting portion 34 is disposed at an interval, toward the vehicle rear side, from the superposed portion of the rear end portion 28A of the radiator support upper side 28 with the apron upper member 26, i.e., from the first supporting portion 32. This second supporting portion 34 is a step lower toward the vehicle lower side with respect to the region at the vehicle front side of the second supporting portion 34, and is a step higher toward the vehicle upper side with respect to the region at the vehicle rear side of the second supporting portion 34. The supporting surface of the second supporting portion 34 faces toward the vehicle upper side (strictly speaking, toward the vehicle upper side and inclined slightly forward) (see FIG. 4). In this way, the second supporting portion 34 is not set on the same plane as the first supporting portion 32 and is offset therefrom in the vehicle vertical direction, and the height position thereof in the vehicle vertical direction is set to be lower than that of the first supporting portion 32.

The bracket 40 that is supported at the first supporting portion 32 and the second supporting portion 34 causes the vehicle body skeleton portion 30 to support the horizontal flange portion 22C of the fender panel 22. The bracket 40 is an impact absorbing structural member formed by press-molding a metal plate (e.g., an aluminum alloy plate or a steel plate or the like) of a predetermined width, and the cross-sectional shape thereof is formed in a hat-shape. Note that there are also cases in which the bracket 40 is called the "fender bracket", the "impact absorbing bracket", the "energy absorbing bracket", and the like.

A fender mounting portion 42, that is a flat-plate-shaped peak wall portion, is formed at the upper end portion of the bracket 40. The horizontal flange portion 22C of the fender 22 is fixed to this fender mounting portion 42. More concretely, a bolt insert-through hole 42A is formed to pass-through the fender mounting portion 42, and further, a weld nut 38 is welded in advance to the reverse surface side thereof. A bolt 36 is screwed-together with this weld nut 38. This bolt 36 is inserted-in from the upper side of the horizontal flange portion 22C in the state in which the horizontal flange portion 22C of the fender panel 22 is placed on the top surface of the fender mounting portion 42 at the bracket 40. Note that the weld nut 38 does not necessarily have to be used in the fastening of the bolt, and an ordinary nut may be used.

In contrast, a first vehicle body side mounting portion 44 and a second vehicle body side mounting portion 46 that are both flat-plate-shaped are formed as a front/rear pair at the lower end portion of the bracket 40. The first vehicle body side mounting portion 44 is placed in state of planar contact on the first supporting portion 32 of the vehicle body skeleton portion 30 (the radiator support upper side 28), and is fixed to the first supporting portion 32 by spot welding (the welding points of the spot welding portions are indicated by the "X" symbols). Further, the second vehicle body side mounting portion 46 is placed in a state of planar contact on the second supporting portion 34 of the vehicle body skeleton portion 30 (the radiator support upper side 28), and is fixed to the second supporting portion 34 by spot welding (the welding points of the spot welding portions are indicated by the "X" symbols).

Further, the front end of the fender mounting portion 42 and the rear end of the first vehicle body side mounting portion 44 are joined in the vehicle vertical direction by a first supporting leg portion 48. In contrast, the rear end of the fender mounting portion 42 and the front end of the second vehicle body side mounting portion 46 are joined in the vehicle vertical direction by a second supporting leg portion 50. The length in the vehicle vertical direction of the second supporting leg portion 50 is set to be longer than the length in the vehicle vertical direction of the first supporting leg portion 48. Further, a second space S2, that extends toward the side of the second supporting leg portion 50 opposite the side of the first supporting leg portion 48, is set to be wider than a first space S1 that extends toward the side of the first supporting leg portion 48 opposite the side of the second supporting leg portion 50. In other words, the bracket 40 is disposed at a position that is set in this way. Note that the first space S1 being narrower than the second space S2 is due to the radiator support upper side 28 being inclined toward a vehicle obliquely upper front side at the vehicle front side of the first supporting portion 32, and the head lamp 24 (see FIG. 1) and the like being disposed at the obliquely upper front side of the first supporting portion 32.

Further, in the present embodiment, a second rotation angle (not illustrated), that is from a start of rotation until the second supporting leg portion 50 abuts another member in a case of rotating the bracket 40, that is in a state of being set at the vehicle, toward the side opposite the side of the first supporting leg portion 48 with the lower end portion of the second supporting leg portion 50 (the portion connected to the second vehicle body side mounting portion 46) being the rotational center and the second supporting leg portion 50 being the radius of rotation, is set to be larger than a first rotation angle (not illustrated), that is from a start of rotation until the first supporting leg portion 48 abuts another member in a case of rotating the bracket 40, that is in a state of being set at the vehicle, toward the side opposite the side of the second supporting leg portion 50 with the lower end portion of the first supporting leg portion 48 (the portion connected to the first vehicle body side mounting portion 44) being the rotational center and the first supporting leg portion 48 being the radius of rotation.

Reinforcing beads 52, 54 that are substantially rectangular are formed at the lower portion side of the bracket 40 at the respective transverse direction central portions of the front side and the rear side thereof. The reinforcing bead 52 at the front side is formed integrally so as to span over the first supporting leg portion 48 and the first vehicle body side mounting portion 44, and extends from the lower end of the first supporting leg portion 48 in a direction along the direction of extension of the first vehicle body side mounting portion 44. The reinforcing bead 54 at the rear side is formed integrally so as to span over the second supporting leg portion 50 and the second vehicle body side mounting portion 46, and extends from the lower end of the second supporting leg portion 50 in a direction along the direction of extension of the second vehicle body side mounting portion 46.

At the upper portion of the first supporting leg portion 48, a first bent portion 56, that is bent so as to be convex toward the side opposite the side of the second supporting leg portion 50 and that has a first ridgeline 56A that extends in the vehicle transverse direction (horizontal direction), is formed, and a first hole 58 is formed so as to pass-through. The first ridgeline 56A is formed at both sides that sandwich the first hole 58. Further, the first hole 58 is formed in a substantially rectangular shape that is long vertically.

Further, a second bent portion 60, that is bent so as to be convex toward the side opposite the side of the first supporting leg portion 48 and that has a second ridgeline 60A that extends in the vehicle transverse direction (horizontal direction), is formed at the upper portion of the second supporting leg portion 50. This second bent portion 60 is set at a position facing the first bent portion 56. Namely, the distance from the horizontal flange portion 22C of the fender panel 22 to the second ridgeline 60A of the second bent portion 60 is set to be equal to the distance from the horizontal flange portion 22C of the fender panel 22 to the first ridgeline 56A of the first bent portion 56. On the other hand, the height dimension of the second ridgeline 60A, that is based on the second supporting leg portion 50, is set to be larger than the height dimension of the first ridgeline 56A that is based on the first supporting leg portion 48.

A second hole 62 that is substantially rectangular is formed to pass-through the upper portion of the second supporting leg portion 50. This second hole 62 is formed in a substantially rectangular shape that is long vertically, and is set at a position facing the first hole 58. Further, the second ridgeline 60A is formed at both sides that sandwich the second hole 62.

Further, as shown in FIG. 4, the relationship between angle θ1, that is formed by the bent surfaces of the first bent portion 56 at the side facing the second supporting leg portion 50, and angle θ2, that is formed by the bent surfaces of the second bent portion 60 at the side facing the first supporting leg portion 48, is set to be θ1<θ2.

The region at the vehicle vertical direction intermediate portion of the first supporting leg portion 48, which region is further toward the lower side than the first bent portion 56, and the region at the vehicle vertical direction intermediate portion of the second supporting leg portion 50, which region is further toward the lower side than the second bent portion 60, are connected by a connecting member 64 (connecting plate) that serves as a connecting portion. The connecting member 64 is a bent plate material that is formed by press molding a metal plate (e.g., an aluminum alloy plate or a steel plate or the like), and has a bridging portion 64A that extends in a connecting direction and connects the first supporting leg portion 48 and the second supporting leg portion 50. The bridging portion 64A is disposed parallel to the fender mounting portion 42. As shown in FIG. 3, in order to ensure the desired rigidity, a bead 64X, that extends in the aforementioned connecting direction at the central portion in the transverse direction (the direction orthogonal to the aforementioned connecting direction), is formed at the bridging portion 64A. This bead 64X is made to be convex downward. Due thereto, the shape, as seen in the aforementioned connecting direction, of the bridging portion 64A is made to be an upside-down hat shape that opens upwardly.

Further, flange portions 64B, 64C (see FIG. 4), that are bent substantially orthogonally toward the lower side of the bracket 40, extend-out from the both sides of the bead 64X at the both end portions in the aforementioned connecting direction at the bridging portion 64A. As shown in FIG. 4, these flange portions 64B, 64C are disposed so as to face one another. Further, at the connecting member 64, the flange portion 64B, that is the end portion at a connecting direction one side, is joined by welding to the hole edge portion at the lower side of the first hole 58, and the flange portion 64C, that is the end portion at the connecting direction other side, is joined by welding to the hole edge portion at the lower side of the second hole 62.

Note that, as shown in FIG. 3, a tongue piece portion 64D, that is bent substantially orthogonally toward the lower side of the bracket 40, extends-out from the transverse direction inner side of the bridging portion 64A. A hole portion 64H, that is for positioning at the time of mounting, is formed so as to pass-through the tongue piece portion 64D.

Operation/Effects of Present Embodiment

The operation and effects of the above-described embodiment are described next.

As shown in FIG. 2, at the bracket 40, the length in the vehicle vertical direction of the second supporting leg portion 50 is set to be longer than the length in the vehicle vertical direction of the first supporting leg portion 48. Therefore, in a case in which a collision body 70 collides with the upper portion of the fender panel 22 from the vehicle upper side and the bracket 40 receives load, the moment that acts on the second supporting leg portion 50 is large as compared with the moment that acts on the first supporting leg portion 48. Accordingly, the second supporting leg portion 50 bendingly deforms more easily than the first supporting leg portion 48. Further, the height position in the vehicle vertical direction of the second supporting portion 34, at which the second supporting leg portion 50 is supported via the second vehicle body side mounting portion 46, is set to be lower than that of the first supporting portion 32 at which the first supporting leg portion 48 is supported via the first vehicle body side mounting portion 44. Due thereto, the bracket 40 on the whole plastically deforms toward the side of the second supporting portion 34, in accordance with the bending deformation of the second supporting leg portion 50. Accordingly, in accordance with the present embodiment, the bracket 40 can be plastically deformed in a stable mode.

Further, in the present embodiment, the second rotation angle (not illustrated), that is from the start of rotation until the second supporting leg portion 50 abuts another member in a case of rotating the bracket 40, that is in a state of being set at the vehicle, toward the side opposite the side of the first supporting leg portion 48 with the lower end portion of the second supporting leg portion 50 being the rotational center and the second supporting leg portion 50 being the radius of rotation, is set to be larger than a first rotation angle (not illustrated), that is from the start of rotation until the first supporting leg portion 48 abuts another member in a case of rotating the bracket 40, that is in a state of being set at the vehicle, toward the side opposite the side of the second supporting leg portion 50 with the lower end portion of the first supporting leg portion 48 being the rotational center and the first supporting leg portion 48 being the radius of rotation. Therefore, the bracket 40 being deformed toward the side of the second supporting portion 34 can make the stroke, until the bracket 40 or the horizontal flange portion 22C of the fender panel 22 abuts another member, be longer than a case in which the bracket 40 is deformed toward the side of the first supporting portion 32. Accordingly, as described above, even if the bracket 40 on the whole is deformed toward the side of the second supporting portion 34, it is possible to delay so-called bottom-touching or to eliminate so-called bottom-touching. In other words, in the present embodiment, limited space is effectively utilized and the energy absorbing performance can be improved.

Figure 5A:
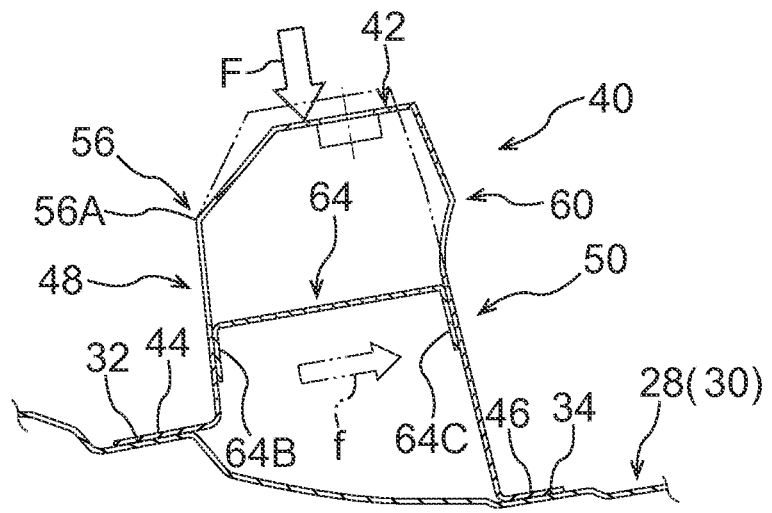
FIG. 5A is a cross-sectional view showing a state in which the bracket of FIG. 4 receives load from the vehicle upper side and the upper portion of the bracket starts to deform.

Here, deformation of the bracket 40 in a case in which the bracket 40 receives load F from the vehicle upper side is described in detail while appropriately referring to FIG. 5A through FIG. 5D. As shown in FIG. 3, at the bracket 40, the first bent portion 56 is formed at the upper portion of the first supporting leg portion 48, and the second bent portion 60 is formed at the upper portion of the second supporting leg portion 50. These first bent portion 56 and second supporting leg portion 50 are bent so as to be convex toward sides that move apart from one another. Therefore, as shown in FIG. 5A, in a case in which the bracket 40 receives the load F from the vehicle upper side, the upper portion of the bracket 40 starts to deform so as to move the first ridgeline 56A and the second ridgeline 60A apart (like a pantograph). Note that the position of the upper portion of the bracket 40 before receiving the load F is shown by the two-dot chain line in FIG. 5A.

On the other hand, the region at the vehicle vertical direction intermediate portion of the first supporting leg portion 48, which region is further toward the lower side than the first bent portion 56, and the region at the vehicle vertical direction intermediate portion of the second supporting leg portion 50, which region is further toward the lower side than the second bent portion 60, are connected by the connecting member 64. Therefore, it is relatively difficult for the first supporting leg portion 48 and the second supporting leg portion 50 to deform at the lower portions thereof where the bent portions are not formed, and it is relatively easy for the first supporting leg portion 48 and the second supporting leg portion 50 to deform at the upper portions thereof where the first bent portion 56 and the second bent portion 60 are formed. Further, in a case in which the bracket 40 receives the load F from the vehicle upper side, when the upper portion of the bracket 40 starts to deform so as to move the first ridgeline 56A and the second ridgeline 60A apart, accompanying this, tension along the connecting direction is applied to the connecting member 64.

Figure 5B:
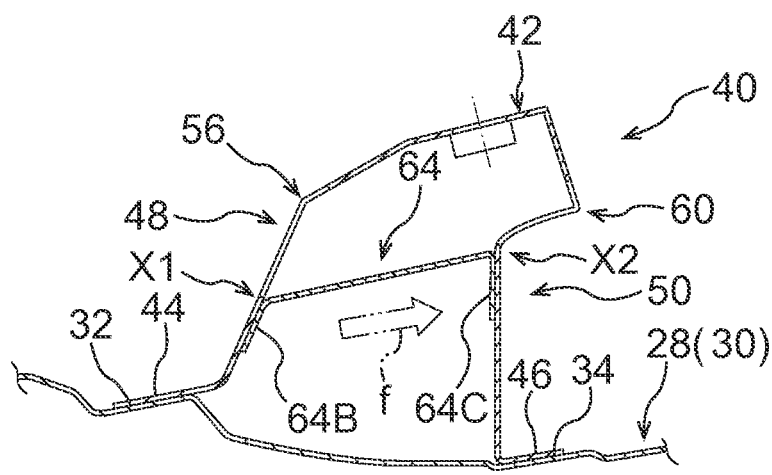
FIG. 5B is a cross-sectional view showing a state after FIG. 5A (a state in which the entire bracket starts to deform so as to collapse) in a case in which the bracket of FIG. 4 receives load from the vehicle upper side.

At this time, because the bracket 40 deforms on the whole toward the side of the second supporting portion 34 in accordance with the bending deformation of the second supporting leg portion 50 as described above, the connecting member 64 is pulled toward the side of the second supporting leg portion 50 (in the arrow f direction) with respect to its initial position. In accordance therewith, as shown in FIG. 5B, the first supporting leg portion 48 is pulled by the connecting member 64 toward the side of the second supporting leg portion 50, and the first supporting leg portion 48 on the whole is displaced so as to collapse toward the side of the second supporting leg portion 50. Further, due to the first supporting leg portion 48 collapsing on the whole, the reaction force, that is due to the first supporting leg portion 48 and is applied to the connecting member 64, is small, and therefore, it is easy for the second supporting leg portion 50 to collapse toward the side opposite the side of the first supporting leg portion 48.

Further, in the present embodiment, as shown in FIG. 4, the angle θ1 of the first bent portion 56 is set to be smaller than the angle θ2 of the second bent portion 60. Therefore, as shown in FIG. 5A, in the initial stage in a case in which the bracket 40 receives the load F from the vehicle upper side, the upper portion of the first supporting leg portion 48 bendingly deforms stably toward the side of the second supporting leg portion 50 with the first ridgeline 56A of the first bent portion 56 being the starting point. Due thereto, because the first supporting leg portion 48 starts to collapse toward the side of the second supporting leg portion 50 from the initial stage, the bracket 40 on the whole deforms more stably toward the side of the second supporting portion 34.

Further, in the present embodiment, at the connecting member 64, the flange portion 64B that is at a connecting direction one side is joined to the hole edge portion at the lower side of the first hole 58, and the flange portion 64C at the connecting direction other side is joined to the hole edge portion at the lower side of the second hole 62. Due thereto, at the first supporting leg portion 48 and the second supporting leg portion 50, the rigidity changes greatly between the region at which the connecting member 64 is joined and the upper side thereof, and therefore, the bracket 40 can be bendingly deformed stably with these rigidity change portions X1, X2 being the starting points of the bending. Namely, in a case in which the bracket 40 on the whole deforms so as to move the first ridgeline 56A and the second ridgeline 60A apart while the bracket 40 deforms toward the side of the second supporting portion 34, the second supporting leg portion 50 that receives reaction force from the connecting member 64 bendingly deforms with the rigidity change portion X2 being the starting point of the bending (see FIG. 5B).

Figure 5C:
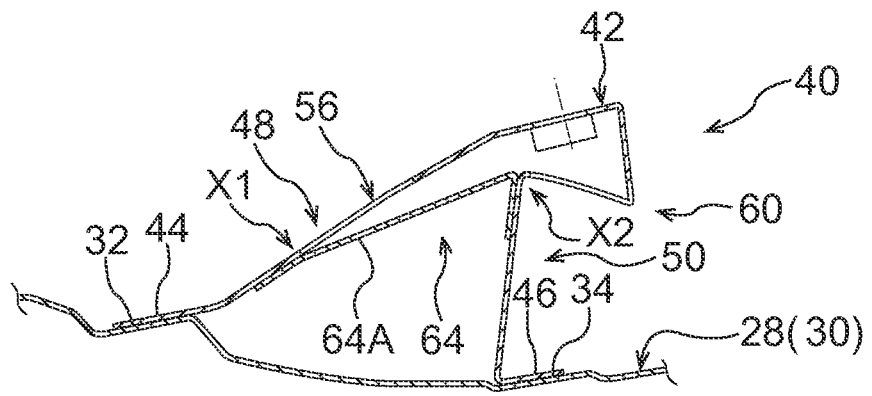
FIG. 5C is a cross-sectional view showing a state after FIG. 5B (a state in which the upper portion of the bracket is greatly crushed) in a case in which the bracket of FIG. 4 receives load from the vehicle upper side.
Figure 5D:
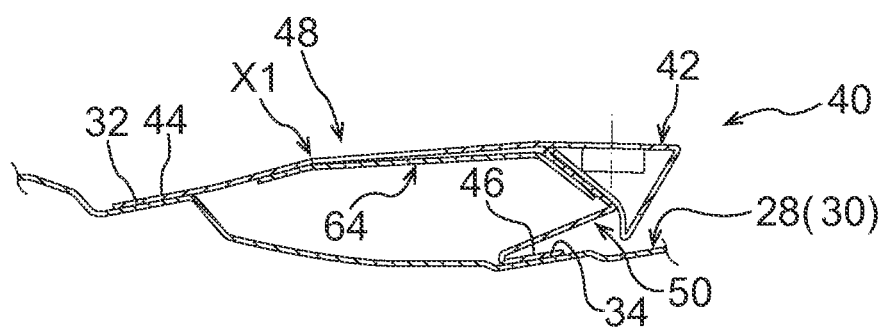
FIG. 5D is a cross-sectional view showing a state after FIG. 5C (a state in which the entire bracket is greatly crushed) in a case in which the bracket of FIG. 4 receives load from the vehicle upper side.

Then, as this bending deformation progresses, as shown in FIG. 5C, the upper portion of the bracket 40 crushingly deforms greatly. When the upper portion of the bracket 40 has been almost completely crushed, the bridging portion 64A of the connecting member 64 and the lower portion of the first supporting leg portion 48 substantially become a single straight line, and thereafter, as shown in FIG. 5D, the upper portion of the second supporting leg portion 50 buckles, and deformation of the bracket 40 ends.

In this way, the bracket 40 deforms in a stable deformation mode, and the upper end front portion of the fender panel 22 shown in FIG. 2 deforms toward the vehicle lower rear side. Namely, even if there is dispersion in the colliding position or the collision velocity of the collision body 70, the bracket 40 deforms in a predetermined deformation mode (the robustness improves). Further, the collision energy is stably absorbed due to the bracket 40 deforming stably in a predetermined deformation mode.

Figure 6:
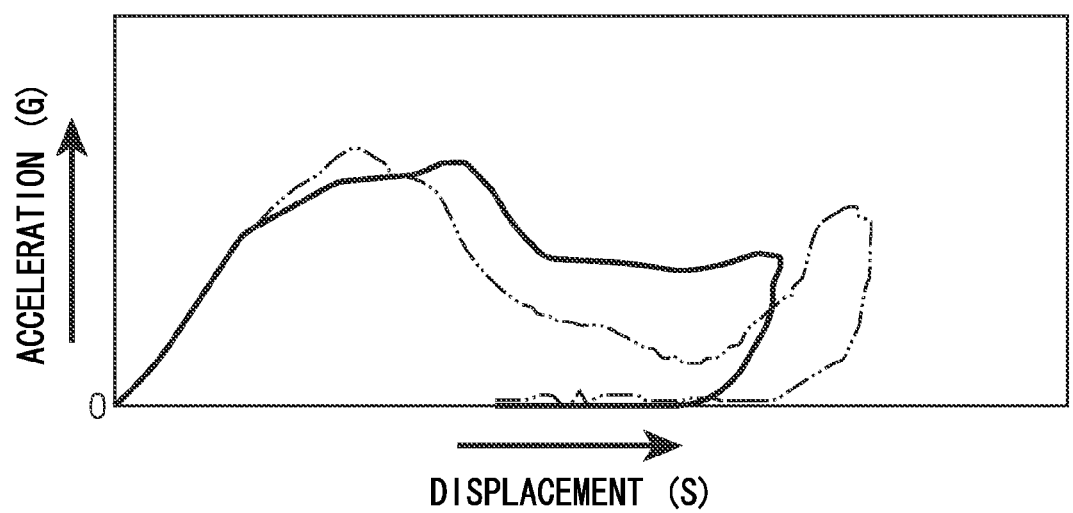
FIG. 6 is a graph showing the relationship between acceleration and displacement at the time when a collision body collides with a parting portion.

The above-described operation is described supplementarily here by using FIG. 6. A G-S graph (the results of a pedestrian protection test), that shows the relationship between acceleration and displacement amount in a case in which a collision body (impactor) collides with the upper portion of a fender panel from a vehicle upper side, is shown in FIG. 6. The solid line shown in this FIG. 6 represents the G-S characteristic in a case in which the fender supporting portion structure relating to the present embodiment is applied, and the two-dot chain line represents the G-S characteristic in a case in which a fender supporting portion structure relating to a comparative structure is applied. In the comparative structure, the lengths, in the vehicle vertical direction, of a pair of front and rear supporting leg portions are set to the same length, and the fixing portions, to the vehicle body skeleton portion side, at the pair of front and rear supporting leg portions are set to the same height position, and moreover, a member corresponding to the connecting member 64 of FIG. 2 is not provided. As can be understood from the graph of FIG. 6, in a case in which the fender supporting portion structure relating to the present embodiment is applied, a decrease in acceleration from the middle stage of the collision and thereafter is suppressed, and good energy absorption (EA) is achieved even at the middle stage of the collision and thereafter.

As described above, in accordance with the fender supporting portion structure 20 relating to the present embodiment, stable energy absorption can be devised.

Supplementary Description of Embodiment

Note that, as a modified example of the above-described embodiment, in accordance with the structure of the peripheral portion of the bracket, the second supporting portion may be provided at an interval toward the vehicle front side, or may be provided at an interval toward the vehicle transverse direction inner side, or may be provided at an interval toward the vehicle transverse direction outer side, with respect to the first supporting portion.

As an example, in a case in which the bracket is disposed at the rear portion top surface of the apron upper member and a member such as a hood hinge or the like is disposed adjacent at the rear side thereof, the second supporting portion, that is at a relatively low height position, may be provided at an interval toward the vehicle front side with respect to the first supporting portion. As the bracket in this case, for example, the bracket 40 of FIG. 2 may be applied by the front/rear thereof being reversed. Further, as another example, in a case in which there is a wider space at the vehicle transverse direction inner side of the position where the bracket is disposed than at the vehicle transverse direction outer side and the vehicle longitudinal direction both sides of the position where the bracket is disposed, the second supporting portion, that is at a relatively low height position, may be provided at an interval toward the vehicle transverse direction inner side with respect to the first supporting portion. As the bracket in this case, for example, the bracket 40 of FIG. 2 may be applied by being rotated 90° to the right as seen in plan view around an axis in the vehicle vertical direction. Moreover, as another example, in a case in which there is a wider space at the vehicle transverse direction outer side of the position where the bracket is disposed than at the vehicle transverse direction inner side and the vehicle longitudinal direction both sides of the position where the bracket is disposed, the second supporting portion, that is at a relatively low height position, may be provided at an interval toward the vehicle traverse direction outer side with respect to the first supporting portion. As the bracket in this case, for example, the bracket 40 may be applied by being rotated 90° to the left as seen in plan view around an axis in the vehicle vertical direction.

Further, as a modified example of the above-described embodiment, depending on the structure of the peripheral portion of the bracket, the second rotation angle, that is from the start of rotation until the second supporting leg portion abuts another member in a case of rotating the bracket, that is in a state of being set at the vehicle, toward the side opposite the side of the first supporting leg portion with the lower end portion of the second supporting leg portion being the rotational center and the second supporting leg portion being the radius of rotation, can also be set to be less than or equal to the first rotation angle, that is from the start of rotation until the first supporting leg portion abuts another member in a case of rotating the bracket, that is in a state of being set at the vehicle, toward the side opposite the side of the second supporting leg portion with the lower end portion of the first supporting leg portion being the rotational center and the first supporting leg portion being the radius of rotation.

Further, as modified examples of the above-described embodiment, a structure in which the first bent portion is not formed at the upper portion of the first supporting leg portion can also be employed, and a structure in which the second bent portion is not formed at the upper portion of the second supporting leg portion can also be employed, and a structure in which the connecting portion is not provided can also be employed.

Further, although the connecting portion is structured by the connecting member 64 that is welded to the bracket 40 in the above-described embodiment, the connecting portion may be a portion that is formed integrally with the bracket.

Further, as modified examples of the above-described embodiment, a structure in which the first hole is not formed to pass-through the upper portion of the first supporting leg portion can also be employed, and a structure in which the second hole is not formed to pass-through the upper portion of the second supporting leg portion can also be employed.

Further, as a modified example of the above-described embodiment, the end portion at a connecting direction one side of the connecting portion may be joined to other than the hole edge portion at the lower side of the first hole. Further, the end portion at the connecting direction other side of the connecting portion may be joined to other than the hole edge portion at the lower side of the second hole.

Moreover, as a modified example of the above-described embodiment, the relationship between the angle $\theta1$, that is formed by the bent surfaces of the first bent portion at the side facing the second supporting leg portion, and the angle $\theta2$, that is formed by the bent surfaces of the second bent portion at the side facing the first supporting leg portion, can also be set to be $\theta1 \geq \theta2$.

Still further, as modified examples of the above-described embodiment, for example, the reinforcing bead 52 shown in FIG. 3 may be extended to the front end of the first vehicle body side mounting portion 44, and/or the reinforcing bead 54 may be extended to the rear end of the second vehicle body side mounting portion 46.

Note that the concept of "supporting surfaces facing toward a vehicle upper side" that is recited in the first aspect of the present invention includes, in addition to a case of the supporting surfaces facing toward the directly upper side in the vehicle vertical direction, also cases in which the supporting surfaces face toward an obliquely upper side of the vehicle as in the above-described embodiment.

Note that the above-described embodiment and the above-described plural modified examples can be implemented by being combined appropriately.

Although an example of the present invention has been described above, the present invention is not limited to the above, and, in addition to the above, can of course be implemented by being modified in various ways within a scope that does not depart from the gist thereof.

Note that the disclosure of Japanese Patent Application No. 2012-243314 is, in its entirety, incorporated by reference into the present Description.

The invention claimed is:

1. A fender supporting portion structure comprising:
vehicle body skeleton portions that are disposed along a vehicle longitudinal direction at both sides of a vehicle body front portion, and that have first supporting portions whose supporting surfaces face toward a vehicle upper side, and second supporting portions that are provided at intervals with respect to the first supporting portions and whose supporting surfaces face toward the vehicle upper side and whose height positions in a vehicle vertical direction are set to be lower than those of the first supporting portions; and
brackets for energy absorption that cause the vehicle body skeleton portions to support inner side end portions of upper portions of fender panels and whose cross-sectional shapes are formed in hat-shapes, and that have fender mounting portions to which the inner side end portions of the upper portions of the fender panels are fixed, first vehicle body side mounting portions that are fixed to the first supporting portions, second vehicle body side mounting portions that are fixed to the second supporting portions, first supporting leg portions that join the fender mounting portions and the first vehicle body side mounting portions in the vehicle vertical direction, and second supporting leg portions that join the fender mounting portions and the second vehicle body side mounting portions in the vehicle vertical direction and whose lengths in the vehicle vertical direction are set to be longer than those of the first supporting leg portions,
wherein a first bent portion, that is bent so as to be convex toward a side opposite a side of the second supporting leg portion and that has a first ridgeline that extends in a horizontal direction, is formed at an upper portion of the first supporting leg portion,
a second bent portion, that is bent so as to be convex toward a side opposite a side of the first supporting leg portion and that has a second ridgeline that extends in the horizontal direction, is formed at an upper portion of the second supporting leg portion, and
a region at a vehicle vertical direction intermediate portion of the first supporting leg portion, which region is further toward a lower side than the first bent portion, and a region at a vehicle vertical direction intermediate portion of the second supporting leg portion, which region is further toward a lower side than the second bent portion, are connected by a connecting portion.

2. The fender supporting portion structure of claim 1, wherein
at the upper portion of the first supporting leg portion, a first hole is formed so as to pass-through, and the first ridgeline is formed at both sides that sandwich the first hole,
at the upper portion of the second supporting leg portion, a second hole is formed so as to pass-through, and the second ridgeline is formed at both sides that sandwich the second hole, and
at the connecting portion, an end portion at a connecting direction one side is joined to a hole edge portion at a lower side of the first hole, and an end portion at a connecting direction other side is joined to a hole edge portion at a lower side of the second hole.

3. The fender supporting portion structure of claim 1, wherein a relationship between angle θ1, that is formed by bent surfaces of the first bent portion at a side facing the second supporting leg portion, and angle θ2, that is formed by bent surfaces of the second bent portion at a side facing the first supporting leg portion, is set to be θ1<θ2.

* * * * *